US012400578B2

(12) United States Patent
Nam

(10) Patent No.: US 12,400,578 B2
(45) Date of Patent: Aug. 26, 2025

(54) DISPLAY DEVICE

(71) Applicant: Samsung Display Co., LTD., Yongin-si (KR)

(72) Inventor: Yanguk Nam, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/418,816

(22) Filed: Jan. 22, 2024

(65) Prior Publication Data

US 2024/0312394 A1 Sep. 19, 2024

(30) Foreign Application Priority Data

Mar. 16, 2023 (KR) ........................ 10-2023-0034823

(51) Int. Cl.
*G09G 3/20* (2006.01)

(52) U.S. Cl.
CPC ..... *G09G 3/2096* (2013.01); *G09G 2330/028* (2013.01); *G09G 2330/045* (2013.01)

(58) Field of Classification Search
CPC ...... G09G 3/2096; G09G 3/20; G09G 3/3696; G09G 3/3291; G09G 2300/0426; G09G 2330/028; G09G 2330/045; G09G 2330/021
See application file for complete search history.

(56) References Cited

U.S. PATENT DOCUMENTS

| | | | | |
|---|---|---|---|---|
| 9,753,470 B1 | 9/2017 | Hawley et al. | | |
| 2011/0175892 A1* | 7/2011 | Lee | G09G 3/3696 | 345/212 |
| 2012/0188216 A1* | 7/2012 | Gu | G09G 3/3225 | 345/204 |
| 2016/0203746 A1* | 7/2016 | Kim | G09G 3/3688 | 345/211 |
| 2019/0318705 A1* | 10/2019 | Lee | G09G 3/3696 | |

FOREIGN PATENT DOCUMENTS

| | | |
|---|---|---|
| KR | 1020180009023 A | 1/2018 |
| KR | 1020210072210 A | 6/2021 |

* cited by examiner

*Primary Examiner* — David Tung
(74) *Attorney, Agent, or Firm* — CANTOR COLBURN LLP

(57) ABSTRACT

A display device includes a display panel including a pixel, a driving voltage generator that provides a driving voltage to a data driver, the data driver that provides a data voltage to the pixel and provides a feedback voltage, which is generated by feeding back the driving voltage within the data driver, to the driving voltage generator, and a timing controller that controls the data driver.

15 Claims, 10 Drawing Sheets

FIG. 3

| VDD1 | VDD Load (mA) | R_PCB+R_CNT | VDD2 |
|---|---|---|---|
| 1.00V+0.05+AV=1.05V+AV | 50mA | 1Ω | 1.00V+AV |
| 1.00V+0.10+AV=1.10V+AV | 100mA | | |
| 1.00V+0.15+AV=1.15V+AV | 150mA | | |
| 1.00V+0.20+AV=1.20V+AV | 200mA | | |
| 1.00V+0.25+AV=1.25V+AV | 250mA | | |
| 1.00V+0.30+AV=1.30V+AV | 300mA | | |
| 1.00V+0.35+AV=1.35V+AV | 350mA | | |
| 1.00V+0.40+AV=1.40V+AV | 400mA | | |

FIG. 6

| VDD1 | VDD Load (mA) | R_PCB+R_CNT+R_PAD | VDD2 |
|---|---|---|---|
| 1.00V+0.05=1.05V | 50mA | 1Ω | 1.00V |
| 1.00V+0.10=1.10V | 100mA | | |
| 1.00V+0.15=1.15V | 150mA | | |
| 1.00V+0.20=1.20V | 200mA | | |
| 1.00V+0.25=1.25V | 250mA | | |
| 1.00V+0.30=1.30V | 300mA | | |
| 1.00V+0.35=1.35V | 350mA | | |
| 1.00V+0.40=1.40V | 400mA | | |

DISPLAY DEVICE

This application claims priority to Korean Patent Application No. 10-2023-0034823, filed on Mar. 16, 2023, and all the benefits accruing therefrom under 35 U.S.C. § 119, the content of which in its entirety is herein incorporated by reference.

BACKGROUND

1. Field

Embodiments of the disclosure relate to a display device. More particularly, embodiments of the disclosure relate to a display device capable of feeding back a driving voltage.

2. Description of the Related Art

In general, a display device may include a display panel, a gate driver, a data driver, and a timing controller. The display panel may include a plurality of gate lines, a plurality of data lines, and a plurality of pixels electrically connected to the gate lines and the data lines. The gate driver may provide gate signals to the gate lines, respectively, the data driver may provide data voltages to the data lines, and the timing controller may control the gate driver and the data driver.

A display device may include a driving voltage generator which generates a driving voltage for driving a data driver. However, a voltage drop (e.g., "IR" drop) may occur in a process where a driving voltage output from the driving voltage generator reaches circuits inside the data driver.

SUMMARY

A feature of the disclosure is to provide a display device capable of feeding back a driving voltage within a data driver.

Another feature of the disclosure is to provide a display device capable of forming a current path between first and second pads of a driving voltage generator.

However, the feature of the disclosure is not limited thereto. Thus, the feature of the disclosure may be extended without departing from the spirit and the scope of the disclosure.

In an embodiment of the disclosure, a display device may include a display panel including a pixel, a driving voltage generator which provides a driving voltage to a data driver, the data driver which provides a data voltage to the pixel and provides a feedback voltage, which is generated by feeding back the driving voltage within the data driver, to the driving voltage generator, and a timing controller which controls the data driver.

In an embodiment, the data driver may include a first pad which receives the driving voltage and a second pad which outputs the feedback voltage.

In an embodiment, the driving voltage generator may include a first pad which outputs the driving voltage and a second pad which receives the feedback voltage.

In an embodiment, the display device may further include a connector disposed between the driving voltage generator and the data driver. In addition, the connector may include a first resistance element including a first electrode electrically connected to the first pad of the driving voltage generator and a second electrode electrically connected to the second pad of the driving voltage generator.

In an embodiment, the connector may further include an output inductor including a first electrode electrically connected to the first pad of the driving voltage generator and a second electrode electrically connected to the first electrode of the first resistance element, a feedback capacitor including a first electrode electrically connected to the first electrode of the first resistance element and a second electrode electrically connected to the second pad of the driving voltage generator, an output capacitor including a first electrode electrically connected to the first electrode of the first resistance element and a second electrode that is grounded, and a driving voltage capacitor including a first electrode electrically connected to the data driver and a second electrode that is grounded.

In an embodiment, the driving voltage generator may further include a voltage controller which is connected to a feedback node and adjusts a voltage level of the driving voltage output by the driving voltage generator, a second resistance element including a first electrode electrically connected to the second pad of the driving voltage generator and a second electrode electrically connected to the feedback node, and a third resistance element including a first electrode electrically connected to the feedback node and a second electrode that is grounded.

In an embodiment, the voltage controller may adjust the voltage level of the driving voltage based on a voltage level of the feedback node.

In an embodiment, a resistance value of the first resistance element may be determined based on a resistance value of the second resistance element and a resistance value of the third resistance element.

In an embodiment, the display device may further include a connector disposed between the driving voltage generator and the data driver. In addition, the connector may include a diode including an anode electrode electrically connected to the first pad of the driving voltage generator and a cathode electrode electrically connected to the second pad of the driving voltage generator.

In an embodiment, the diode may be a junction diode.

In an embodiment of the disclosure, a display device may include a display panel including a pixel, a driving voltage generator which provides a driving voltage to a data driver and includes a first pad which outputs the driving voltage and a second pad which receives a feedback voltage, the data driver which provides a data voltage to the pixel, a timing controller which controls the data driver, and a connector which is disposed between the driving voltage generator and the data driver, provides the feedback voltage, which is generated by feeding back the driving voltage applied to the data driver, to the driving voltage generator, and includes a first resistance element including a first electrode electrically connected to the first pad of the driving voltage generator and a second electrode electrically connected to the second pad of the driving voltage generator.

In an embodiment, the connector may further include an output inductor including a first electrode electrically connected to the first pad of the driving voltage generator and a second electrode electrically connected to the first electrode of the first resistance element, a feedback capacitor including a first electrode electrically connected to the first electrode of the first resistance element and a second electrode electrically connected to the second pad of the driving voltage generator, an output capacitor including a first electrode electrically connected to the first electrode of the first resistance element and a second electrode that is grounded, and a driving voltage capacitor including a first electrode electrically connected to the data driver and a second electrode that is grounded.

In an embodiment, the driving voltage generator may further include a voltage controller which adjusts a voltage level of the driving voltage output by the driving voltage generator, a second resistance element including a first electrode electrically connected to the second pad of the driving voltage generator and a second electrode electrically connected to a feedback node, and a third resistance element including a first electrode electrically connected to the feedback node and a second electrode that is grounded.

In an embodiment, the voltage controller may adjust the voltage level of the driving voltage based on a voltage level of the feedback node.

In an embodiment, a resistance value of the first resistance element may be determined based on a resistance value of the second resistance element and a resistance value of the third resistance element.

By embodiments, a display device may include a display panel including a pixel, a driving voltage generator which provides a driving voltage to a data driver and includes a first pad which outputs the driving voltage and a second pad which receives a feedback voltage, the data driver which provides a data voltage to the pixel, a timing controller which controls the data driver, and a connector which is disposed between the driving voltage generator and the data driver, provides the feedback voltage, which is generated by feeding back the driving voltage applied to the data driver, to the driving voltage generator, and includes a diode including an anode electrode electrically connected to the first pad of the driving voltage generator and a cathode electrode electrically connected to the second pad of the driving voltage generator.

In an embodiment, the diode may be a junction diode.

In an embodiment, the connector may further include an output inductor including a first electrode electrically connected to the first pad of the driving voltage generator and a second electrode electrically connected to the anode electrode of the diode, a feedback capacitor including a first electrode electrically connected to the anode electrode of the diode and a second electrode electrically connected to the second pad of the driving voltage generator, an output capacitor including a first electrode electrically connected to the anode electrode of the diode and a second electrode that is grounded, and a driving voltage capacitor including a first electrode electrically connected to the data driver and a second electrode that is grounded.

In an embodiment, the driving voltage generator may further include a voltage controller which adjusts a voltage level of the driving voltage output by the driving voltage generator, a second resistance element including a first electrode electrically connected to the second pad of the driving voltage generator and a second electrode electrically connected to a feedback node, and a third resistance element including a first electrode electrically connected to the feedback node and a second electrode that is grounded.

In an embodiment, the voltage controller may adjust the voltage level of the driving voltage based on a voltage level of the feedback node.

Therefore, a display device in embodiments may feed back a driving voltage within a data driver, so that a voltage drop caused by a resistance (i.e., a connection resistance) at a first pad of a data driver may be compensated for. Accordingly, the display device may not determine the driving voltage in consideration of a worst case of the voltage drop caused by the connection resistance, so that power consumption may be reduced.

In addition, a display device in embodiments may form a current path between first and second pads of a driving voltage generator, so that an increase in a driving voltage caused by opening of a feedback line to which a feedback voltage is applied may be minimized. Accordingly, the display device may be prevented from being burnt or the like by the increase in the driving voltage.

However, the effect of the disclosure is not limited thereto. Thus, the effect of the disclosure may be extended without departing from the spirit and the scope of the disclosure.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIG. 3 is a table illustrating an embodiment in which a voltage controller of FIG. 2 adjusts a first driving voltage.

FIG. 6 is a table illustrating an embodiment in which a voltage controller of FIG. 5 adjusts a first driving voltage.

DETAILED DESCRIPTION

Figure 1:
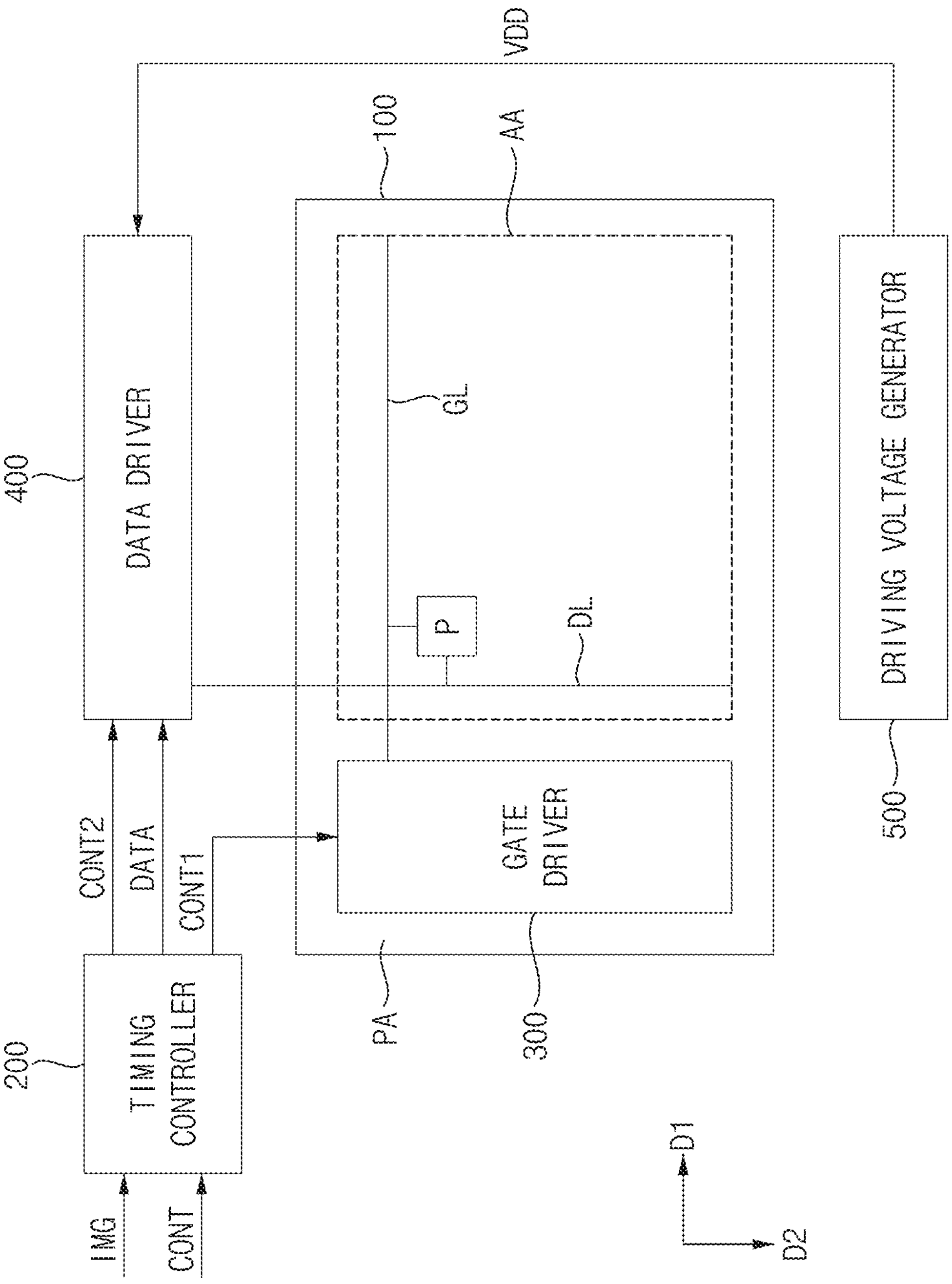
FIG. 1 is a block diagram illustrating an embodiment of a display device.

Hereinafter, embodiments of the disclosure will be explained in detail with reference to the accompanying drawings.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms “first,” “second,” “third” etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, “a first element,” “component,” “region,” “layer” or “section” discussed below could be termed a second element, component, region, layer or section without departing from the teachings herein.

The terminology used herein is for the purpose of describing particular embodiments only and is not intended to be limiting. As used herein, the singular forms “a,” “an,” and “the” are intended to include the plural forms, including “at least one,” unless the content clearly indicates otherwise. “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as “lower” or “bottom” and “upper” or “top,” may be used herein to describe one element’s relationship to another element as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on “upper” sides of the other elements. The exemplary term “lower,” can therefore, encompasses both an orientation of “lower” and “upper,” depending on the particular orientation of the figure. Similarly, if the device in one of the figures is turned over, elements described as “below” or “beneath” other elements would then be oriented “above” the other elements. The exemplary terms “below” or “beneath” can, therefore, encompass both an orientation of above and below.

“About” or “approximately” as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term “about” can mean within one or more standard deviations, or within +30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram illustrating an embodiment of a display device.

Referring to FIG. 1, the display device may include a display panel 100, a timing controller 200, a gate driver 300, a data driver 400, and a driving voltage generator 500. In an embodiment, the timing controller 200 and the data driver 400 may be integrated on one chip.

The display panel 100 may include a display part AA in which an image is displayed, and a peripheral part PA that is adjacent to the display part AA. In an embodiment, a gate driver 300 may be disposed (e.g., mounted) in the peripheral part PA.

The display panel 100 may include a plurality of gate lines GL, a plurality of data lines DL, and a plurality of pixels P electrically connected to the gate lines GL and the data lines DL. The gate lines GL may extend in a first direction D1, and the data lines DL may extend in a second direction D2 intersecting the first direction D1.

The timing controller 200 may receive input image data IMG and an input control signal CONT from a main processor (e.g., a graphic processing unit (“GPU”), etc.). In an embodiment, the input image data IMG may include red image data, green image data, and blue image data, for example. In an embodiment, the input image data IMG may further include white image data. In another embodiment, the input image data IMG may include magenta image data, yellow image data, and cyan image data. The input control signal CONT may include a master clock signal and a data enable signal. The input control signal CONT may further include a vertical synchronization signal and a horizontal synchronization signal.

The timing controller 200 may generate a first control signal CONT1, a second control signal CONT2, and a data signal DATA based on the input image data IMG and the input control signal CONT.

The timing controller 200 may generate the first control signal CONT1 for controlling an operation of the gate driver 300 based on the input control signal CONT to output the generated first control signal CONT1 to the gate driver 300. The first control signal CONT1 may include a vertical start signal and a gate clock signal.

The timing controller 200 may generate the second control signal CONT2 for controlling an operation of the data driver 400 based on the input control signal CONT to output the generated second control signal CONT2 to the data driver 400. The second control signal CONT2 may include a horizontal start signal and a load signal.

The timing controller 200 may receive the input image data IMG and the input control signal CONT to generate the data signal DATA. The timing controller 200 may output the data signal DATA to the data driver 400.

The gate driver 300 may generate gate signals for driving the gate lines GL in response to the first control signal CONT1 received from the timing controller 200. The gate driver 300 may output the gate signals to the gate lines GL. In an embodiment, the gate driver 300 may sequentially output the gate signals to the gate lines GL, for example.

The data driver 400 may receive the second control signal CONT2 and the data signal DATA from the timing controller 200. The data driver 400 may generate data voltages obtained by converting the data signal DATA into an analog voltage. The data driver 400 may output the data voltages to the data lines DL.

The driving voltage generator 500 may provide a driving voltage VDD to the data driver 400. The driving voltage VDD may be a power voltage for driving the data driver 400.

Although the driving voltage generator 500 has been illustrated in the illustrated embodiment as providing the driving voltage VDD to the data driver 400, the disclosure is not limited thereto. In an embodiment, the driving voltage generator 500 may provide a driving voltage for driving the timing controller 200 to the timing controller 200, for example. In an embodiment, the driving voltage generator 500 may provide a driving voltage to an integrated chip on which the timing controller 200 and the data driver 400 are integrated, for example. In an embodiment, the driving voltage generator 500 may provide a driving voltage for driving the gate driver 300 to the gate driver 300, for example.

In addition, a configuration of a connector 600, which will be described below, may not be limited to that between the driving voltage generator 500 and the data driver 400.

For convenience of description, in FIGS. 2 to 4 and 6 to 9, the driving voltage VDD output from the driving voltage generator 500 may be denoted as a first driving voltage VDD1, and the driving voltage VDD that is fed back may be denoted as a second driving voltage VDD2. In other words, the second driving voltage VDD2 may be a voltage obtained by subjecting the first driving voltage VDD1 to a voltage drop.

For convenience of description, although a first pad 410 and a second pad 420 of the data driver 400 and a first pad 510 and a second pad 520 of the driving voltage generator 500 have been shown in FIGS. 2 to 4 and 6 to 9 as single pads, the disclosure is not limited thereto. In an embodiment, in order to reduce a resistance (i.e., a connection resistance) at a pad, the display device may receive or output the driving voltages VDD1 and VDD2 or a feedback voltage FV from a plurality of pads connected in parallel, for example.

Although R_PAD has been shown in FIGS. 2 to 4 and 6 to 9 as being included inside the data driver 400, R_PAD may represent a resistance at the first pad 410 (i.e., a connection resistance at the first pad 410 of the data driver 400). In an embodiment, R_PAD may represent a chip-on-plastic ("COP") compression resistance at the first pad 410 generated in a COP process of compressing the data driver 400 implemented as a chip to the connector 600 implemented as a printed circuit board, for example.

Figure 2:
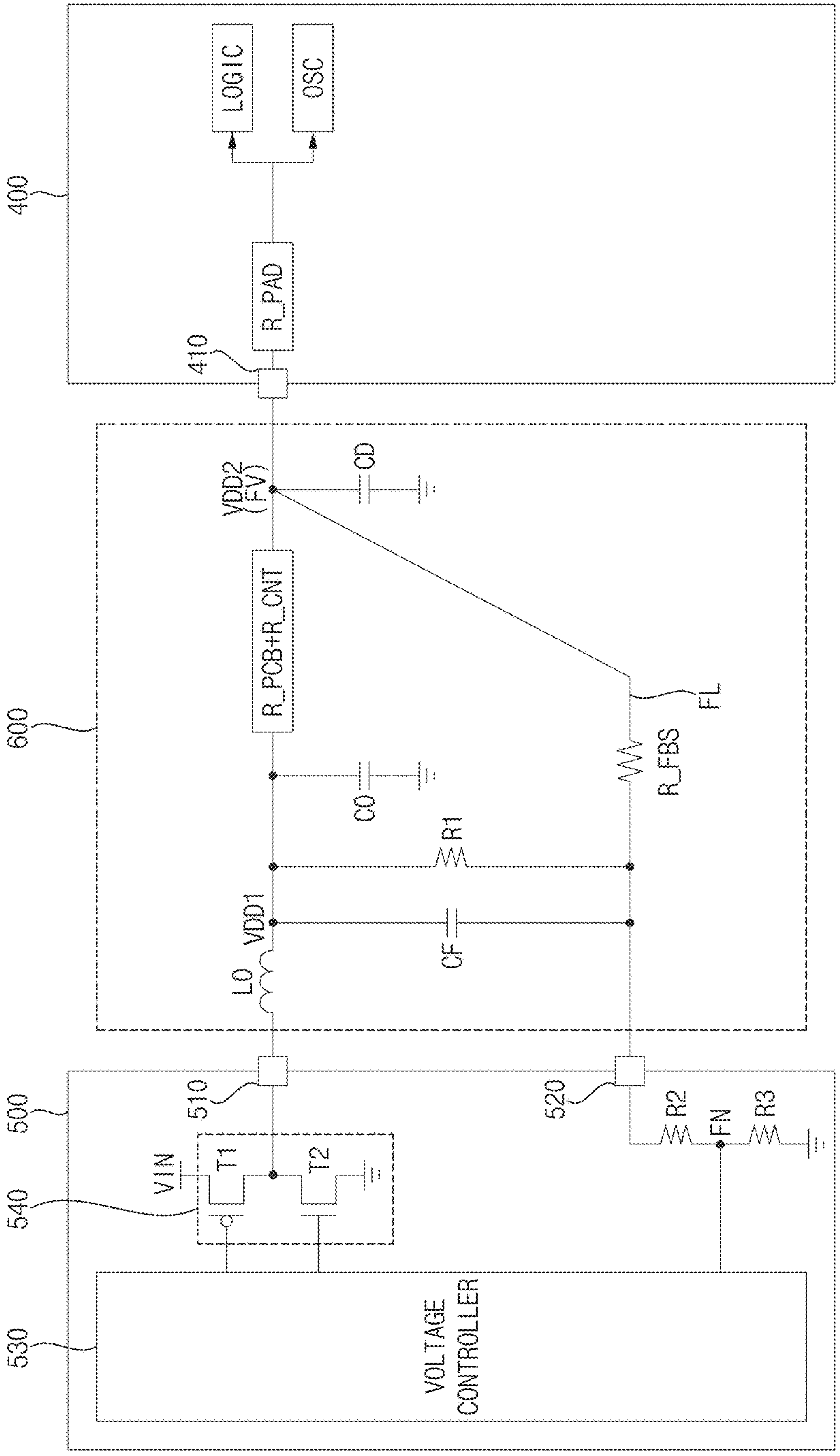
FIG. 2 is a diagram illustrating an embodiment of a data driver, a driving voltage generator, and a connector of the display device of FIG. 1.

FIG. 2 is a diagram illustrating an embodiment of a data driver 400, a driving voltage generator 500, and a connector 600 of the display device of FIG. 1, and FIG. 3 is a table illustrating an embodiment in which a voltage controller 530 of FIG. 2 adjusts a first driving voltage VDD1.

Referring to FIGS. 1 and 2, the data driver 400 may include a first pad 410 which receives the driving voltage VDD. The driving voltage VDD may drive the data driver 400. In an embodiment, the driving voltage VDD may drive a logic circuit LOGIC which performs a logic operation of the data driver 400, for example. In an embodiment, the driving voltage VDD may drive a clock signal generation circuit OSC which generates a clock signal of the data driver 400, for example.

The driving voltage generator 500 may include a first pad 510 which outputs the driving voltage VDD, and a second pad 520 which receives the feedback voltage FV.

The driving voltage generator 500 may further include: a voltage controller 530 which is connected to a feedback node FN, and adjusts a voltage level of the driving voltage output by the driving voltage generator 500 (i.e., the first driving voltage VDD1); a second resistance element R2 including a first electrode electrically connected to the second pad 520 of the driving voltage generator 500, and a second electrode electrically connected to the feedback node FN; and a third resistance element R3 including a first electrode electrically connected to the feedback node FN, and a second electrode that is grounded.

In an embodiment, the driving voltage generator 500 may further include a switch unit 540 which adjusts the first driving voltage VDD1. In an embodiment, the switch unit 540 may include: a first transistor T1 including a control electrode connected to the voltage controller 530, a first electrode which receives an input voltage VIN, and a second electrode connected to the first pad 510 of the driving voltage generator 500; and a second transistor T2 including a control electrode connected to the voltage controller 530, a first electrode connected to the first pad 510 of the driving voltage generator 500, and a second electrode that is ground, for example. The input voltage VIN may be a voltage provided from an external circuit or device.

In an embodiment, the voltage controller 530 may control on-off of the first transistor T1 and the second transistor T2, for example. In an embodiment, the first transistor T1 and the second transistor T2 may be alternately turned on and off, for example. When the first transistor T1 is turned on, the second transistor T2 may be turned off. When the second transistor T2 is turned off, the first transistor T1 may be turned on. When the first transistor T1 is turned on by receiving a control signal from the voltage controller 530, the input voltage VIN may be applied to an output inductor LO and an output capacitor CO. When the second transistor T2 is turned on by receiving a control signal from the voltage controller 530, a first electrode of the output inductor LO may be grounded. Therefore, when the second transistor T2 is turned on, a forward current flowing through the output inductor LO may be reduced. Therefore, the first transistor T1 and the second transistor T2 of the switch unit 540 may be alternately turned on and off to convert the input voltage VIN into an output voltage (i.e., the first driving voltage VDD1), which is a voltage that is lower than the input voltage VIN.

Although the first transistor T1 and the second transistor T2 have been illustrated in the illustrated embodiment as being used to output the voltage that is lower than the input voltage VIN, the disclosure is not limited to a configuration for outputting the voltage that is lower than the input voltage VIN.

The connector 600 may be disposed between the driving voltage generator 500 and the data driver 400, may provide the feedback voltage FV generated by feeding back the driving voltage (i.e., the second driving voltage VDD2) applied to the data driver 400 to the driving voltage generator 500, and may include a first resistance element R1 including a first electrode electrically connected to the first pad 510 of the driving voltage generator 500, and a second electrode electrically connected to the second pad 520 of the driving voltage generator 500.

The connector 600 may include: an output inductor LO including a first electrode electrically connected to the first pad 510 of the driving voltage generator 500, and a second electrode electrically connected to the first electrode of the first resistance element R1; a feedback capacitor CF including a first electrode electrically connected to the first electrode of the first resistance element R1, and a second electrode electrically connected to the second pad 520 of the driving voltage generator 500; an output capacitor CO including a first electrode electrically connected to the first electrode of the first resistance element R1, and a second electrode that is grounded; and a driving voltage capacitor CD including a first electrode electrically connected to the data driver 400, and a second electrode that is grounded.

In an embodiment, the connector 600 may be implemented as a printed circuit board ("PCB"). In addition, a contact hole which connects mutually different layers to each other may be defined in the connector 600.

Referring to FIGS. 1 to 3, the voltage controller 530 may determine the first driving voltage VDD1 in consideration of a voltage drop caused by a resistance R_PCB of the printed circuit board and/or a resistance R_CNT of the contact hole.

In an embodiment, the connector 600 may charge the output capacitor CO with the first driving voltage VDD1, for example. The first driving voltage VDD1 may be applied to the driving voltage capacitor CD through the printed circuit board and/or the contact hole. A voltage obtained by subjecting the first driving voltage VDD1 to the voltage drops caused by the resistance R_PCB of the printed circuit board and the resistance R_CNT of the contact hole may be the second driving voltage VDD2. The driving voltage capacitor CD may be charged with the second driving voltage VDD2. The data driver 400 may receive the second driving voltage VDD2.

The driving voltage generator 500 may receive the feedback voltage FV generated by feeding back the second driving voltage VDD2. In an embodiment, the driving voltage generator 500 may receive a voltage obtained by a voltage drop caused by a resistance R_FBS of a feedback line FL to which the feedback voltage FV is applied, for example.

The voltage controller 530 may adjust the voltage level of the driving voltage (i.e., the first driving voltage VDD1) based on a voltage level of the feedback node FN. In an embodiment, the voltage controller 530 may receive a voltage of the feedback node FN, which is obtained by performing voltage distribution by the second resistor element R2 and the third resistor element R3, for example.

The voltage controller 530 may calculate a load of the driving voltage VDD based on the voltage level of the feedback node FN. The voltage controller 530 may adjust the first driving voltage VDD1 based on the load of the driving voltage VDD. In an embodiment, the load of the driving voltage VDD may be a current of a line to which the driving voltage VDD is applied, for example.

In an embodiment, for convenience of description, it will be assumed that a sum of the resistance R_PCB of the printed circuit board and the resistance R_CNT of the contact hole is about 1 ohm (Ω), and a voltage for driving the logic circuit LOGIC and the clock signal generation circuit OSC is 1 volt (V), for example. When the load of the driving voltage VDD is 50 milliampere (mA), the first driving voltage VDD1 may be about 1.05+AV (in the unit of V). In addition, since the voltage drops caused by the resistance R_PCB of the printed circuit board and the resistance R_CNT of the contact hole is about 0.05 V, the second driving voltage VDD2 may be about 1.00+AV (in the unit of V). In this case, AV may be a worst-case voltage of a voltage drop caused by a connection resistance R_PAD of the first pad 410 of the data driver 400.

Figure 4:
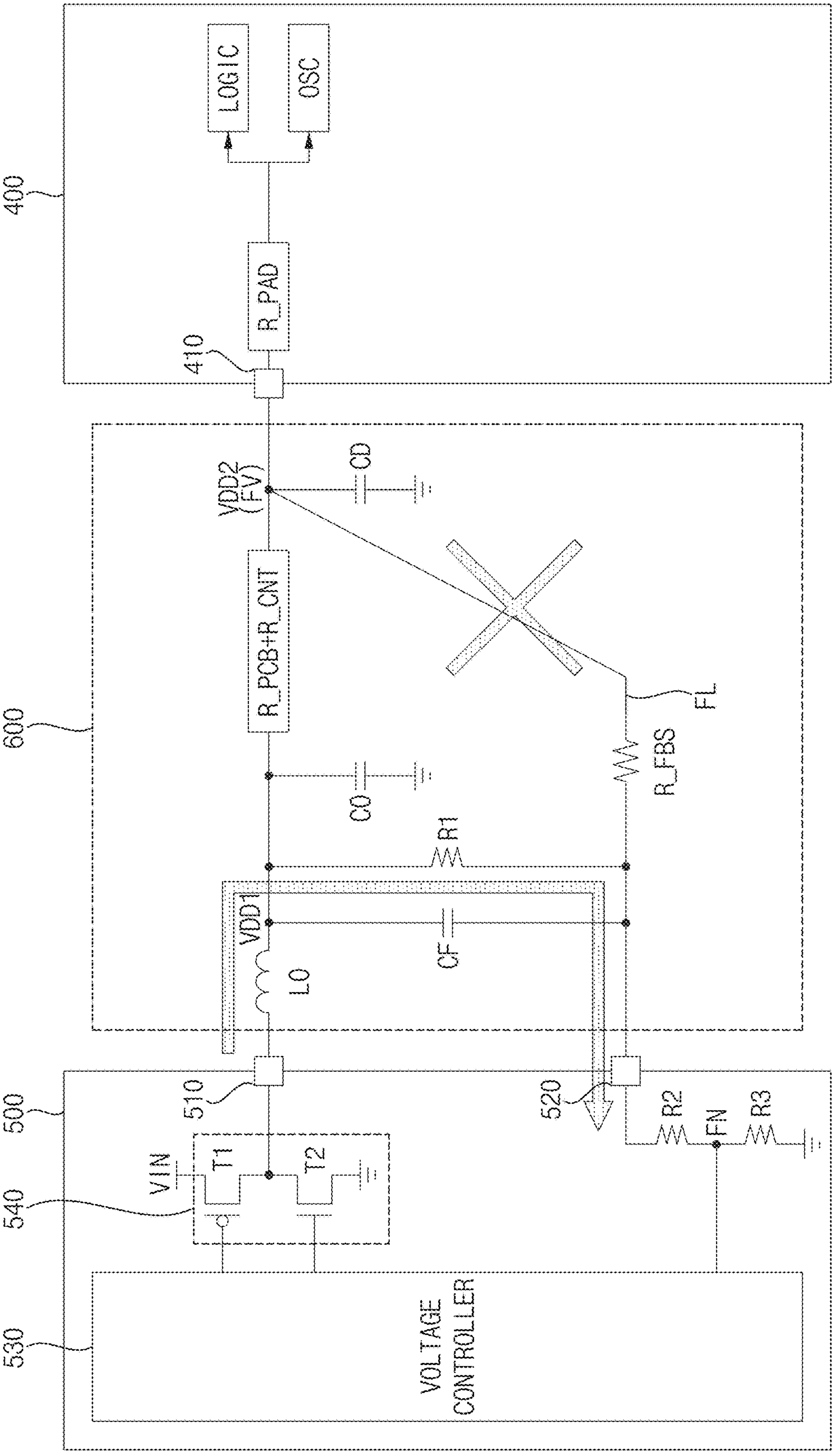
FIG. 4 is a diagram illustrating a current path when a feedback line is opened in the voltage controller of FIG. 2.

FIG. 4 is a diagram illustrating a current path when a feedback line FL is opened in the voltage controller 530 of FIG. 2.

Referring to FIG. 4, in a case where the feedback line FL to which the feedback voltage FV is applied is opened, a current path passing through the first resistance element R1 may be formed. When the first resistance element R1 is not provided, in the case where the feedback line FL is opened, a voltage level of a voltage received by the driving voltage generator 500 through the second pad 520 may be reduced. In this case, the voltage controller 530 may determine that the load of the driving voltage VDD is reduced, and may increase the first driving voltage VDD1. Accordingly, the first driving voltage VDD1 may be increased to the input voltage VIN, and heat may be generated in the data driver 400 and/or the connector 600 due to the increase in the first driving voltage VDD1, so that the display device may be burnt.

Therefore, the display device may form a current path between the first pad 510 and the second pad 520 of the driving voltage generator 500, so that an increase in the driving voltage VDD caused by opening of the feedback line FL to which the feedback voltage FV is applied may be minimized. Accordingly, the display device may be prevented from being burnt or the like by the increase in driving voltage VDD.

The second pad 520 of the driving voltage generator 500 may receive a current flowing through the first resistance element R1 and a current flowing through the feedback line FL. In addition, when a resistance value of the first resistance element R1 is excessively less than each of resistance values of the second resistance element R2 and the third resistance element R3, the current flowing through the first resistance element R1 may be increased. Accordingly, when the feedback line FL is not opened, the voltage controller 530 may determine that the load of the driving voltage VDD is excessively greater than an actual load.

In addition, when the resistance value of the first resistance element R1 is excessively greater than each of the resistance values of the second resistance element R2 and the third resistance element R3, the current flowing through the first resistance element R1 may be reduced. Accordingly, when the feedback line FL is opened, the voltage controller 530 may not properly reduce the first driving voltage VDD1, so that a burning phenomenon or the like may be caused.

Therefore, the resistance value of the first resistance element R1 may be determined based on the resistance value of the second resistance element R2 and the resistance value of the third resistance element R3. In an embodiment, the resistance value of the first resistance element R1 may be experimentally determined according to the resistance value of the second resistance element R2 and the resistance value of the third resistance element R3. In an embodiment, the resistance value of the first resistance element R1 may be calculated from a mathematical formula having the resistance value of the second resistance element R2 and the resistance value of the third resistance element R3 as variables. However, the disclosure is not limited to a scheme of determining the resistance value of the first resistance element R1.

Figure 5:
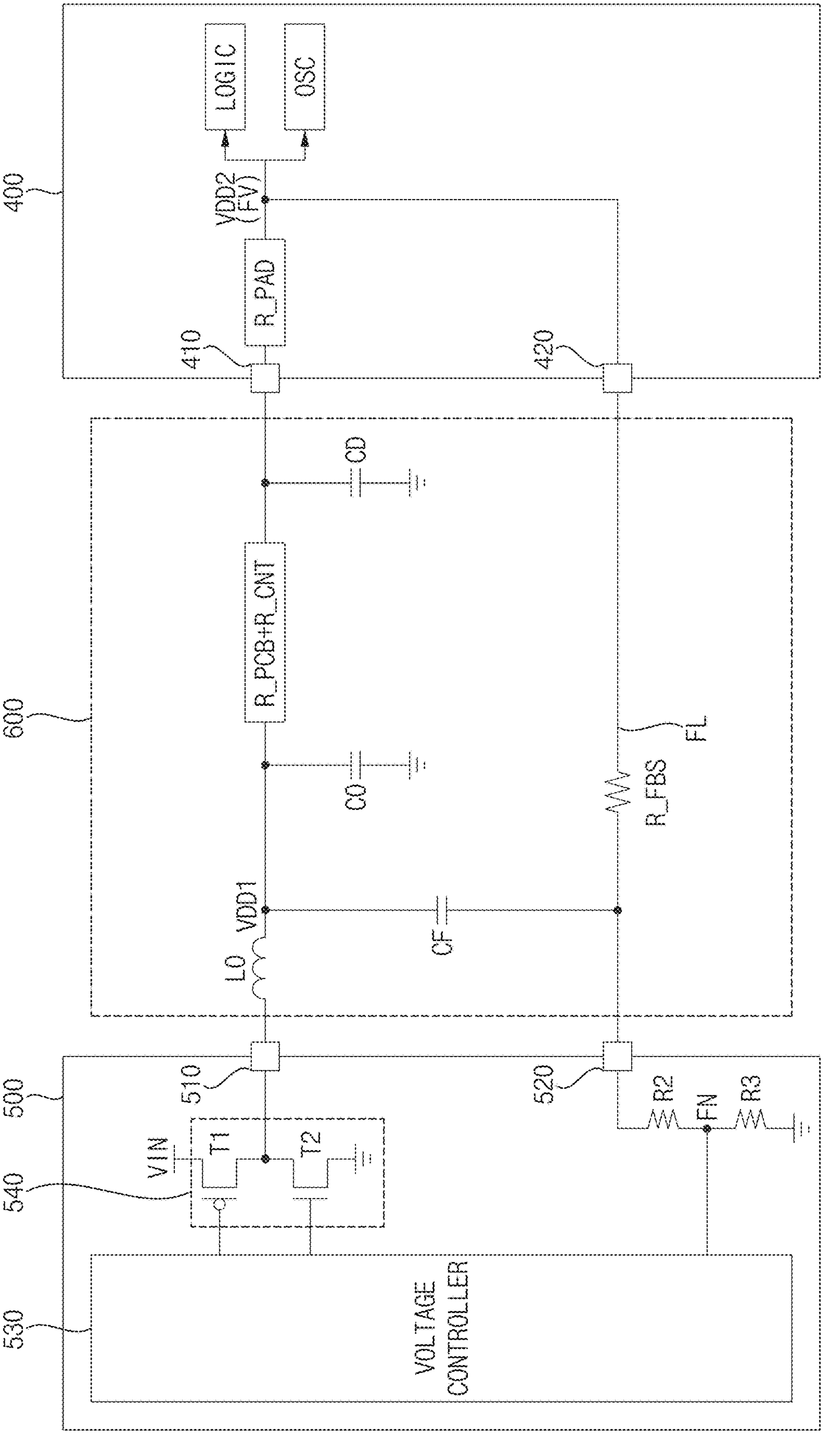
FIG. 5 is a diagram illustrating an embodiment of a data driver, a driving voltage generator, and a connector of a display device.

FIG. 5 is a diagram illustrating a data driver 400, a driving voltage generator 500, and a connector 600 of a display device in embodiments, and FIG. 6 is a table illustrating an embodiment in which a voltage controller 530 of FIG. 5 adjusts a first driving voltage VDD1.

Referring to FIGS. 1, 5, and 6, the data driver 400 may provide a feedback voltage FV generated by feeding back the driving voltage VDD within the data driver 400 to the driving voltage generator 500. The data driver 400 may include a first pad 410 which receives the driving voltage VDD, and a second pad 420 which outputs the feedback voltage FV.

The voltage controller 530 may determine the first driving voltage VDD1 in consideration of voltage drops caused by a resistance R_PCB of the printed circuit board, a resistance R_CNT of the contact hole, and a connection resistance R_PAD of the first pad 410 of the data driver 400.

In an embodiment, the connector 600 may charge the output capacitor CO with the first driving voltage VDD1, for example. The first driving voltage VDD1 may be applied to the logic circuit LOGIC and the clock signal generation circuit OSC through the printed circuit board, the contact hole, and the first pad 410 of the data driver 400. A voltage obtained by subjecting the first driving voltage VDD1 to the voltage drops caused by the resistance R_PCB of the printed circuit board, the resistance R_CNT of the contact hole, and the connection resistance R_PAD of the first pad 410 of the data driver 400 may be the second driving voltage VDD2.

The driving voltage generator 500 may receive the feedback voltage FV generated by feeding back the second driving voltage VDD2. In an embodiment, the driving voltage generator 500 may receive a voltage obtained by a voltage drop caused by a resistance R_FBS of a feedback line FL to which the feedback voltage FV is applied, for example.

The voltage controller 530 may adjust the voltage level of the driving voltage (i.e., the first driving voltage VDD1) based on a voltage level of the feedback node FN. In an embodiment, the voltage controller 530 may receive a voltage of the feedback node FN, which is obtained by performing voltage distribution by the second resistor element R2 and the third resistor element R3, for example.

The voltage controller 530 may calculate a load of the driving voltage VDD based on the voltage level of the feedback node FN. The voltage controller 530 may adjust the first driving voltage VDD1 based on the load of the driving voltage VDD. In an embodiment, the load of the driving voltage VDD may be a current of a line to which the driving voltage VDD is applied, for example.

In an embodiment, for convenience of description, it will be assumed that a sum of the resistance R_PCB of the printed circuit board, the resistance R_CNT of the contact hole, and the connection resistance R_PAD of the first pad 410 of the data driver 400 is about 1Ω, and a voltage for driving the logic circuit LOGIC and the clock signal generation circuit OSC is about 1 V, for example. When the load of the driving voltage VDD is about 50 mA, the first driving voltage VDD1 may be about 1.05 V. In addition, since the voltage drops caused by the resistance R_PCB of the printed circuit board, the resistance R_CNT of the contact hole, and the connection resistance R_PAD of the first pad 410 of the data driver 400 is about 0.05 V, the second driving voltage VDD2 may be about 1.00 V.

Therefore, the display device may compensate for the voltage drop caused by the connection resistance R_PAD at the first pad 410 of the data driver 400. Accordingly, the display device may not determine the driving voltage VDD in consideration of a worst case of the voltage drop caused by the connection resistance R_PAD of the first pad 410 of the data driver 400, so that power consumption may be reduced.

Figure 7:
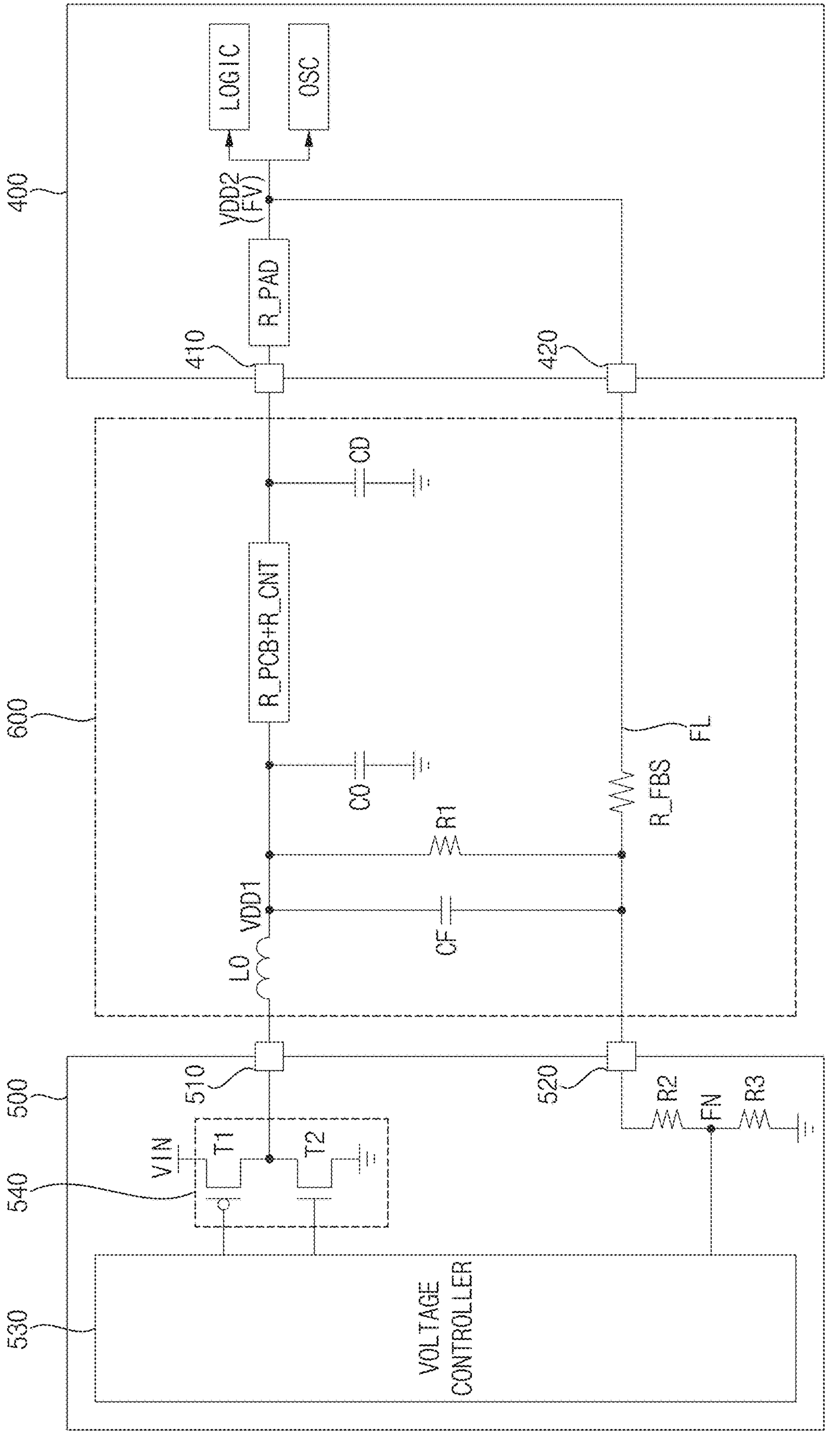
FIG. 7 is a diagram illustrating an embodiment of a data driver, a driving voltage generator, and a connector of a display device.

FIG. 7 is a diagram illustrating a data driver 400, a driving voltage generator 500, and a connector 600 of a display device.

Since a display device in the illustrated embodiments has a configuration that is substantially identical to the configuration of the display device of FIG. 1 except for the feedback of the driving voltage VDD, the same reference numbers and reference symbols will be used for the same or similar components, and redundant descriptions will be omitted.

Referring to FIGS. 1 and 7, the data driver 400 may provide a feedback voltage FV generated by feeding back the driving voltage VDD within the data driver 400 to the driving voltage generator 500. The data driver 400 may include a first pad 410 which receives the driving voltage VDD, and a second pad 420 which outputs the feedback voltage FV.

Since the feedback of the display device of FIG. 7 is substantially identical to the feedback of the display device of FIG. 5, detailed descriptions thereof will be omitted.

Figure 8:
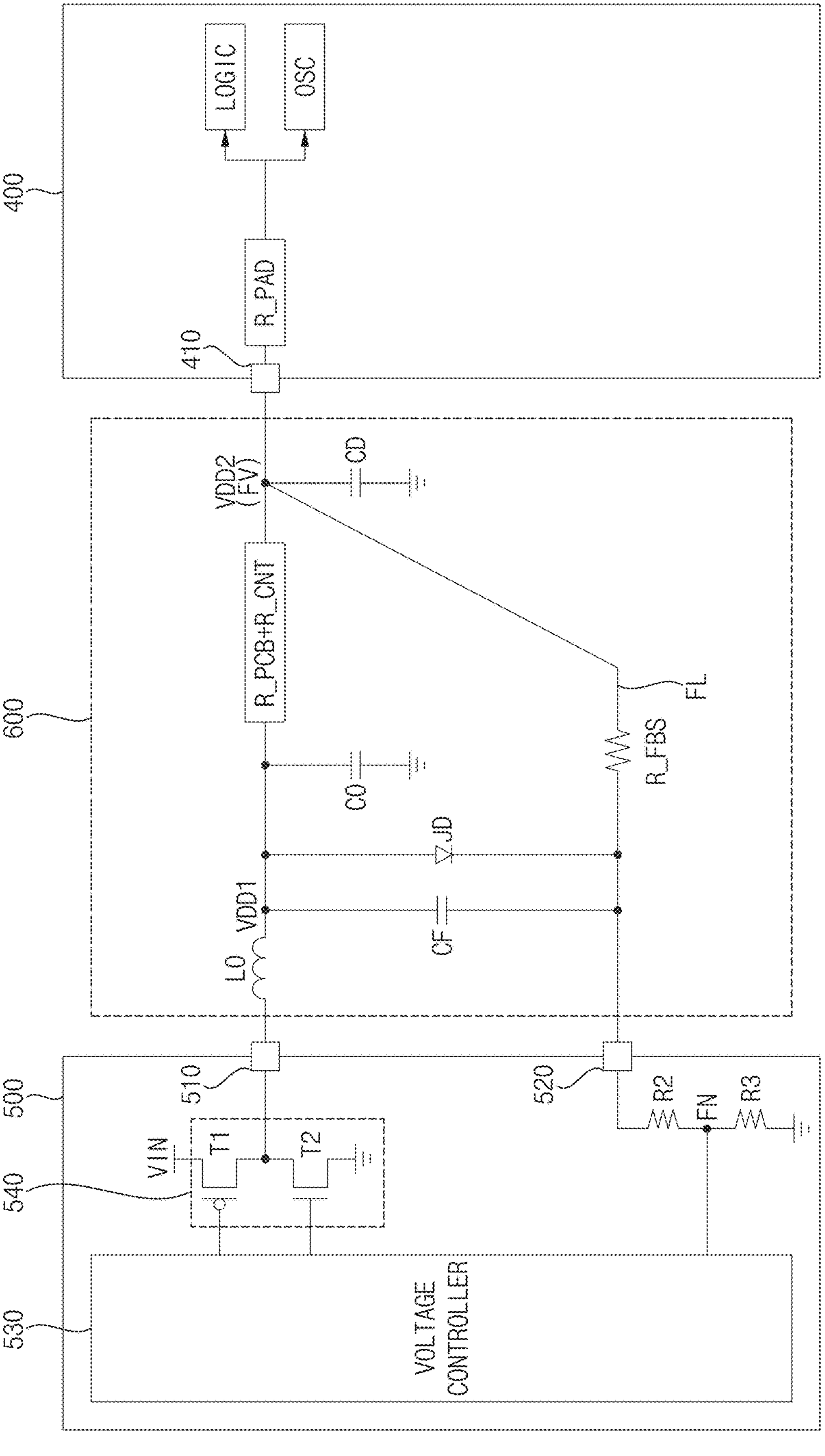
FIG. 8 is a diagram illustrating an embodiment of a data driver, a driving voltage generator, and a connector of a display device.

FIG. 8 is a diagram illustrating a data driver 400, a driving voltage generator 500, and a connector 600 of a display device.

Since a display device in the illustrated embodiments has a configuration that is substantially identical to the configuration of the display device of FIG. 2 except for a diode JD, the same reference numbers and reference symbols will be used for the same or similar components, and redundant descriptions will be omitted.

Referring to FIG. 8, the connector 600 may include a diode JD including an anode electrode electrically connected to the first pad 510 of the driving voltage generator 500, and a cathode electrode electrically connected to the second pad 520 of the driving voltage generator 500. In an embodiment, the diode JD may be a junction diode, for example.

In a case where the feedback line FL to which the feedback voltage FV is applied is opened, a current path passing through the diode JD may be formed. When the diode JD is not provided, in the case where the feedback line FL is opened, a voltage level of a voltage received by the driving voltage generator 500 through the second pad 520 may be reduced. In this case, the voltage controller 530 may determine that the load of the driving voltage VDD is reduced, and may increase the first driving voltage VDD1. Accordingly, the first driving voltage VDD1 may be increased to the input voltage VIN, and the display device may be burnt.

Therefore, the display device may form a current path between the first pad 510 and the second pad 520 of the driving voltage generator 500, so that an increase in the driving voltage VDD caused by opening of the feedback line FL to which the feedback voltage FV is applied may be minimized. Accordingly, the display device may be prevented from being burnt or the like by the increase in driving voltage VDD.

Figure 9:
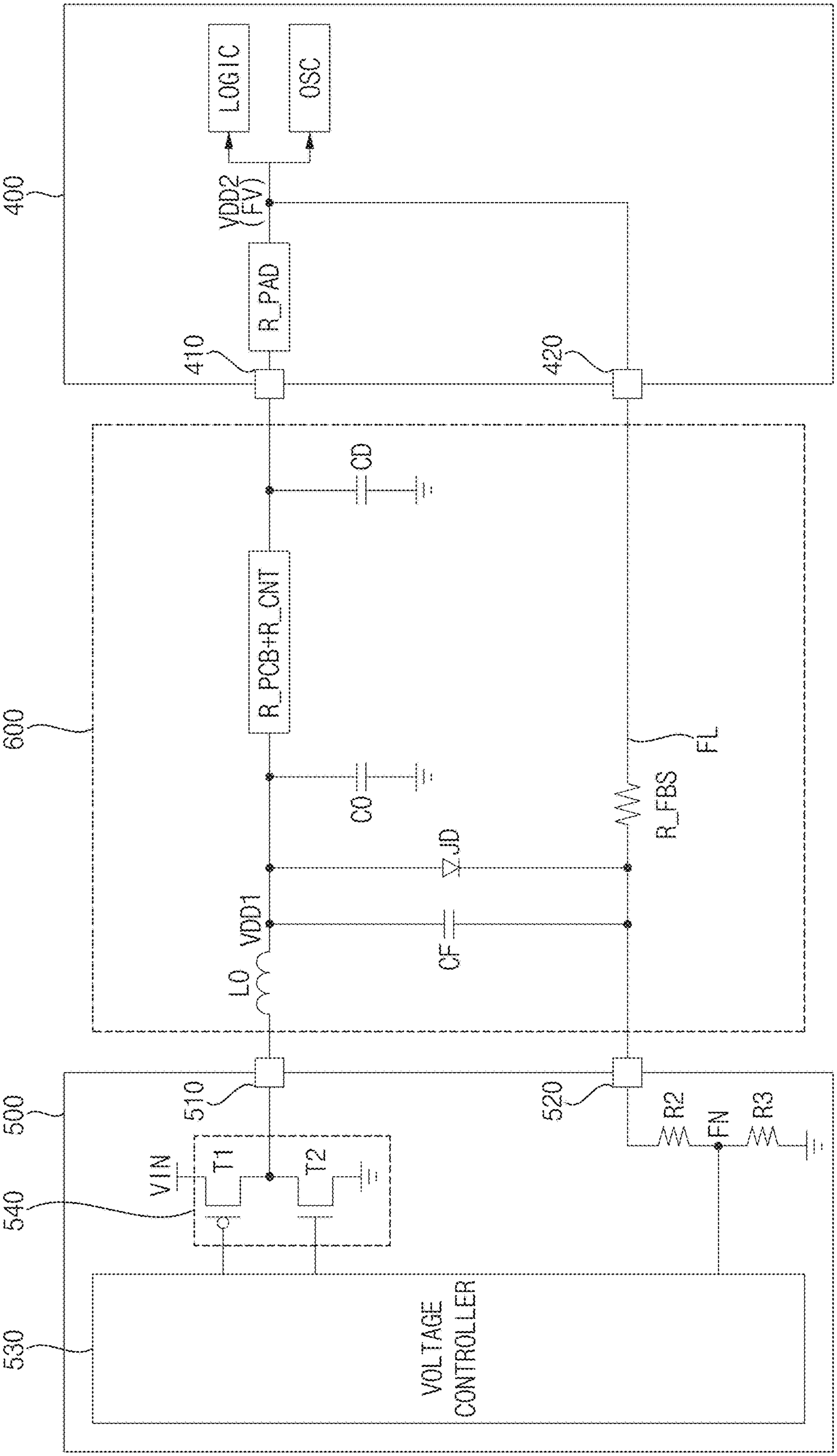
FIG. 9 is a diagram illustrating an embodiment of a data driver, a driving voltage generator, and a connector of a display device.

FIG. 9 is a diagram illustrating a data driver 400, a driving voltage generator 500, and a connector 600 of a display device.

Since a display device in the illustrated embodiments has a configuration that is substantially identical to the configuration of the display device of FIG. 8 except for the feedback of the driving voltage VDD, the same reference numbers and reference symbols will be used for the same or similar components, and redundant descriptions will be omitted.

Referring to FIGS. 1 and 9, the data driver 400 may provide a feedback voltage FV generated by feeding back the driving voltage VDD within the data driver 400 to the driving voltage generator 500. The data driver 400 may include a first pad 410 which receives the driving voltage VDD, and a second pad 420 which outputs the feedback voltage FV.

Since the feedback of the display device of FIG. 9 is substantially identical to the feedback of the display device of FIG. 5, detailed descriptions thereof will be omitted.

Figure 10:
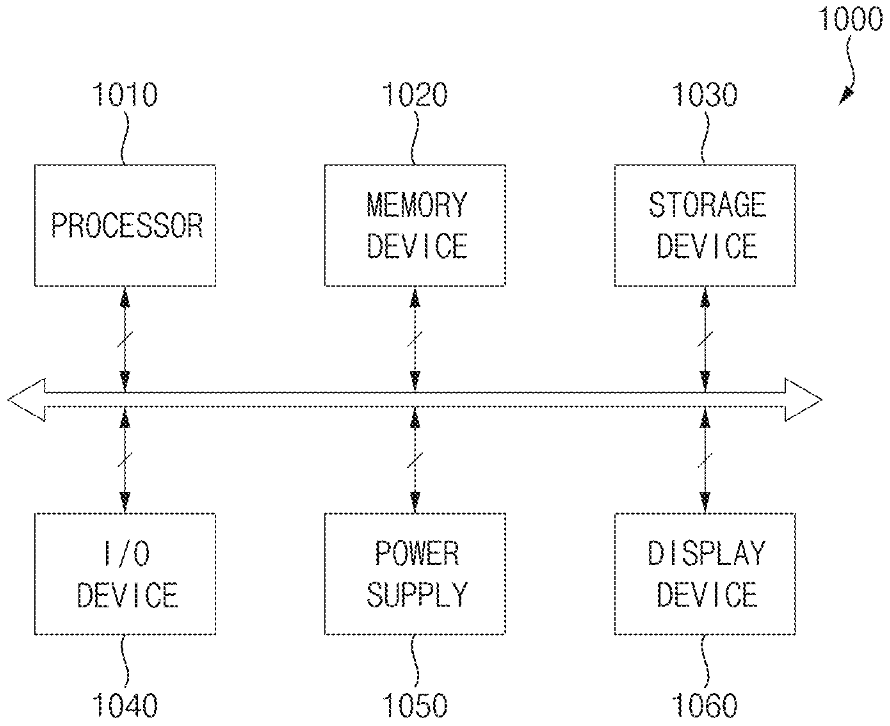
FIG. 10 is a block diagram illustrating an embodiment of an electronic device.
Figure 11:
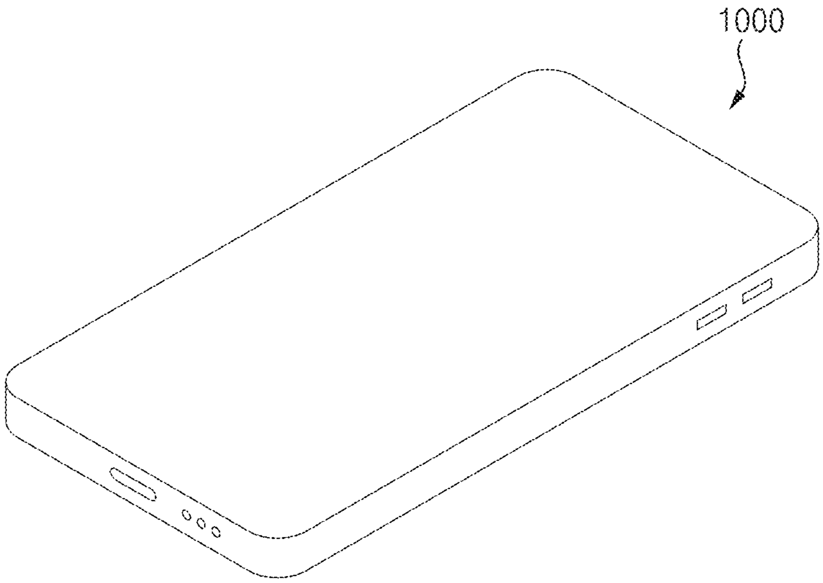
FIG. 11 is a diagram illustrating an embodiment in which the electronic device of FIG. 10 is implemented as a smart phone.

FIG. 10 is a block diagram illustrating an electronic device 1000 in embodiments, and FIG. 11 is a diagram illustrating an embodiment in which the electronic device 1000 of FIG. 10 is implemented as a smart phone.

Referring to FIGS. 10 and 11, the electronic device 1000 may include a processor 1010, a memory device 1020, a storage device 1030, an input/output ("I/O") device 1040, a power supply 1050, and a display device 1060. Here, the display device 1060 may be the display device of FIG. 1. In addition, the electronic device 1000 may further include a plurality of ports for communicating with a video card, a sound card, a memory card, a universal serial bus ("USB") device, other electronic devices, etc. In an embodiment, as shown in FIG. 11, the electronic device 1000 may be implemented as a smart phone. However, the electronic device 1000 is not limited thereto. In an embodiment, the electronic device 1000 may be implemented as a cellular phone, a video phone, a smart pad, a smart watch, a tablet personal computer ("PC"), a car navigation system, a computer monitor, a laptop, a head disposed (e.g., mounted) display ("HMD") device, etc., for example.

The processor 1010 may perform various computing functions. The processor 1010 may be a micro processor, a central processing unit ("CPU"), an application processor ("AP"), etc. The processor 1010 may be coupled to other components via an address bus, a control bus, a data bus, etc. Further, the processor 1010 may be coupled to an extended bus such as a peripheral component interconnection ("PCI") bus.

The memory device 1020 may store data for operations of the electronic device 1000. In an embodiment, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile DRAM device, etc., for example.

The storage device 1030 may include a solid state drive ("SSD") device, a hard disk drive ("HDD") device, a compact disc read-only memory ("CD-ROM") device, etc.

The I/O device 1040 may include an input device such as a keyboard, a keypad, a mouse device, a touch-pad, a touch-screen, etc., and an output device such as a printer, a speaker, etc. In some embodiments, the I/O device 1040 may include the display device 1060.

The power supply 1050 may provide power for operations of the electronic device 1000. In an embodiment, the power supply 1050 may be a power management integrated circuit ("PMIC"), for example.

The display device 1060 may display an image corresponding to visual information of the electronic device 1000. In some embodiments, the display device 1060 may be an organic light-emitting display device or a quantum dot light-emitting display device, but is not limited thereto. The display device 1060 may be connected to other components through the buses or other communication links.

The disclosure may be applied to a display device and an electronic device including the display device. In an embodiment, the disclosure may be applied to a digital television, a three dimensional ("3D") television, a smart phone, a cellular phone, a PC, a tablet PC, a virtual reality ("VR") device, a home appliance, a laptop, a personal digital assistant ("PDA"), a portable media player ("PMP"), a digital camera, a music player, a portable game console, a car navigation system, etc., for example.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the disclosure. Accordingly, all such modifications are intended to be included within the scope of the disclosure as defined in the claims. Therefore, it is to be understood that the foregoing is illustrative of various embodiments and is not to be construed as limited to the illustrative embodiments disclosed, and that modifications to the disclosed embodiments, as well as other embodiments, are intended to be included within the scope of the appended claims.

What is claimed is:

1. A display device comprising:
- a display panel including a pixel;
- a driving voltage generator which provides a driving voltage to a data driver;
- the data driver which provides a data voltage to the pixel and provides a feedback voltage, which is generated by feeding back the driving voltage within the data driver, to the driving voltage generator;
- a timing controller which controls the data driver; and
- a connector disposed between the driving voltage generator and the data driver,
- wherein the driving voltage generator includes:
  - a first pad which outputs the driving voltage; and
  - a second pad which receives the feedback voltage, and
- wherein the connector includes:
  - an output inductor including a first electrode electrically connected to the first pad of the driving voltage generator and a second electrode;
  - a feedback capacitor including a first electrode electrically connected to the second electrode of the output inductor and a second electrode electrically connected to the second pad of the driving voltage generator;
  - an output capacitor including a first electrode electrically connected to the second electrode of the output inductor and a second electrode which is grounded; and
  - a driving voltage capacitor including a first electrode electrically connected to the data driver and a second electrode which is grounded.

2. The display device of claim 1, wherein the data driver includes:
- a first pad which receives the driving voltage; and
- a second pad which outputs the feedback voltage.

3. The display device of claim 1, wherein the connector further includes a first resistance element including a first electrode electrically connected to the second electrode of the output inductor and a second electrode electrically connected to the second pad of the driving voltage generator.

4. The display device of claim 3, wherein the driving voltage generator further includes:
- a voltage controller which is connected to a feedback node and adjusts a voltage level of the driving voltage output by the driving voltage generator;
- a second resistance element including a first electrode electrically connected to the second pad of the driving voltage generator and a second electrode electrically connected to the feedback node; and
- a third resistance element including a first electrode electrically connected to the feedback node and a second electrode which is grounded.

5. The display device of claim 4, wherein the voltage controller adjust the voltage level of the driving voltage based on a voltage level of the feedback node.

6. The display device of claim 4, wherein a resistance value of the first resistance element is determined based on a resistance value of the second resistance element and a resistance value of the third resistance element.

7. The display device of claim 1, wherein the connector further includes a diode including an anode electrode electrically connected to the second electrode of the output inductor and a cathode electrode electrically connected to the second pad of the driving voltage generator.

8. The display device of claim 7, wherein the diode is a junction diode.

9. A display device comprising:

a display panel including a pixel;

a driving voltage generator which provides a driving voltage to a data driver, the driving voltage generator including:

a first pad which outputs the driving voltage; and a second pad which receives a feedback voltage;

the data driver which provides a data voltage to the pixel;

a timing controller which controls the data driver; and a connector which is disposed between the driving voltage generator and the data driver and provides the feedback voltage, which is generated by feeding back the driving voltage applied to the data driver, to the driving voltage generator, wherein the connector includes:

a first resistance element including a first electrode electrically connected to the first pad of the driving voltage generator; and a second electrode electrically connected to the second pad of the driving voltage generator;

an output inductor including a first electrode electrically connected to the first pad of the driving voltage generator and a second electrode electrically connected to the first electrode of the first resistance element;

a feedback capacitor including a first electrode electrically connected to the first electrode of the first resistance element and a second electrode electrically connected to the second pad of the driving voltage generator;

an output capacitor including a first electrode electrically connected to the first electrode of the first resistance element and a second electrode which is grounded; and a driving voltage capacitor including a first electrode electrically connected to the data driver and a second electrode which is grounded.

10. The display device of claim 9, wherein the driving voltage generator further includes:

a voltage controller which adjusts a voltage level of the driving voltage output by the driving voltage generator;

a second resistance element including a first electrode electrically connected to the second pad of the driving voltage generator and a second electrode electrically connected to a feedback node; and a third resistance element including a first electrode electrically connected to the feedback node and a second electrode which is grounded.

11. The display device of claim 10, wherein the voltage controller adjust the voltage level of the driving voltage based on a voltage level of the feedback node.

12. The display device of claim 10, wherein a resistance value of the first resistance element is determined based on a resistance value of the second resistance element and a resistance value of the third resistance element.

13. An electronic device comprising:

a display device comprising:

a display panel including a pixel;

a driving voltage generator which provides a driving voltage to a data driver;

the data driver which provides a data voltage to the pixel and provides a feedback voltage, which is generated by feeding back the driving voltage within the data driver, to the driving voltage generator;

a timing controller which controls the data driver; and a connector disposed between the driving voltage generator and the data driver, wherein the driving voltage generator includes:

a first pad which outputs the driving voltage; and a second pad which receives the feedback voltage, and wherein the connector includes:

an output inductor including a first electrode electrically connected to the first pad of the driving voltage generator and a second electrode;

a feedback capacitor including a first electrode electrically connected to the second electrode of the output inductor and a second electrode electrically connected to the second pad of the driving voltage generator;

an output capacitor including a first electrode electrically connected to the second electrode of the output inductor and a second electrode which is grounded; and a driving voltage capacitor including a first electrode electrically connected to the data driver and a second electrode which is grounded.

14. The electronic device of claim 13, wherein the data driver includes:

a first pad which receives the driving voltage; and a second pad which outputs the feedback voltage.

15. The electronic device of claim 13, wherein the connector further includes a first resistance element including a first electrode electrically connected to the second electrode of the output inductor and a second electrode electrically connected to the second pad of the driving voltage generator.

* * * * *